United States Patent Office 2,829,058
Patented Apr. 1, 1958

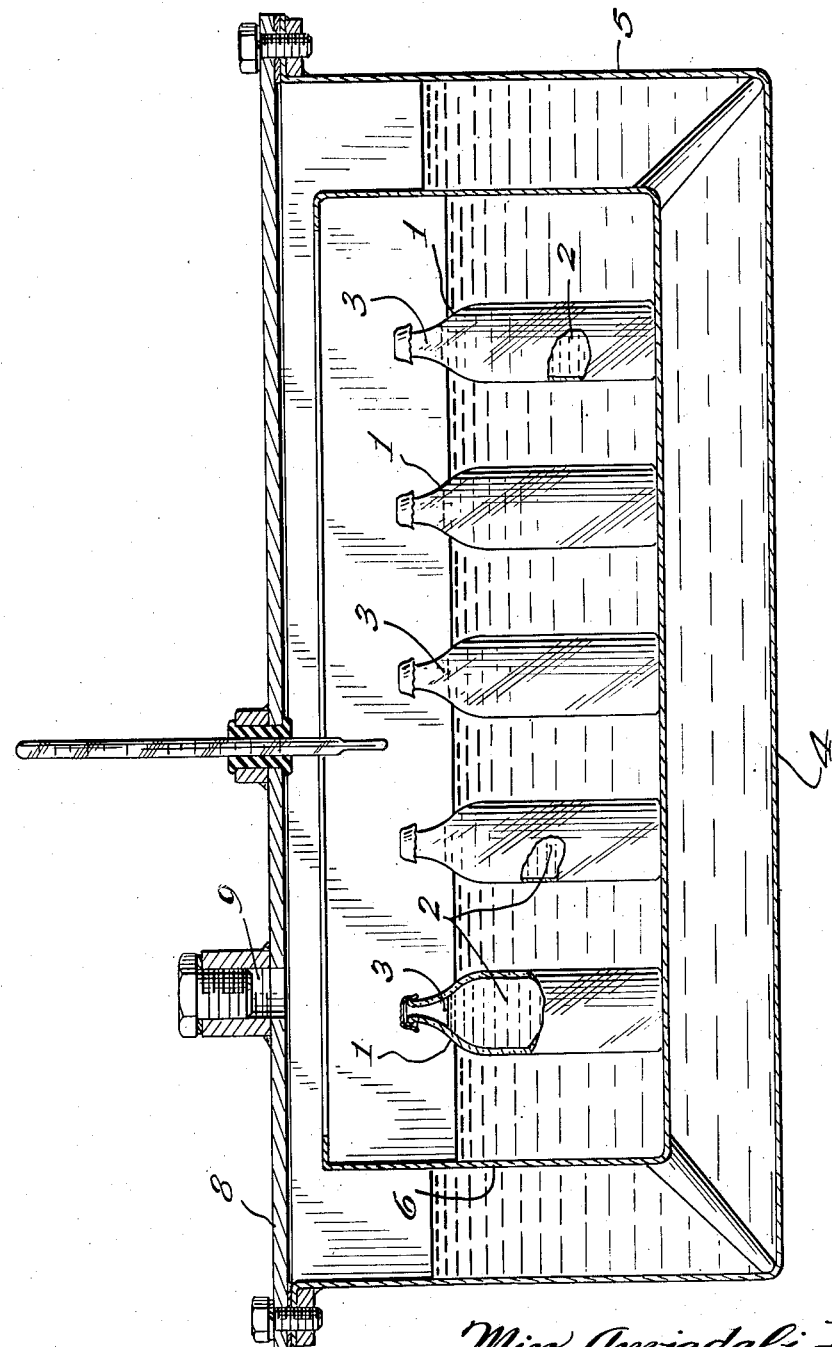

2,829,058

PRESERVING MILK, NEERA, AND LIKE PERISHABLE LIQUIDS

Mir Amjadali Kazmi, Victoria Gardens, Bombay, India, assignor of fifty percent to Lukas & Associates, a partnership Application October 29, 1954, Serial No. 465,706

12 Claims. (Cl. 99—212)

This invention relates to an improved process for preserving milk, neera and like perishable liquids; neera being the Indian name for a liquid comprising the unfermented juice obtained from the seed pods of the palm tree group which includes the cocoanut, date and sago palms.

It is known to preserve perishable liquids by methods such as pasteurization, sterilization and by chemical means. All such methods have, however, the disadvantage that they only preserve the liquids a limited period and are expensive and cumbersome to carry out in practice.

Pasteurization is, for example, perhaps the best method so far adapted for the preservation of milk. This method keeps the milk in a good state of preservation for only about 72 hours and then only if the milk is stored under cool conditions. Besides being expensive to produce, pasteurized milk should be transported in insulated containers and stored in refrigeration plants.

Where chemicals are employed, they affect the flavor of the liquid and sometimes have a deleterious effect on the vitamin content. Milk, for example, has been preserved by the addition of hydrogen peroxide but this method is cumbersome in that the added hydrogen peroxide must be fully removed prior to consumption of the milk. This method has the added disadvantage that, when milk has been so treated, it cannot be used for preparing curds or buttermilk.

It is an object of the invention to provide a process whereby perishable liquids intended for human consumption, such as milk, may be kept in their original fresh state for indefinite periods of time without the addition of chemicals or preservatives, without the use of cumbersome and expensive processes and without the deterioration of the flavor or reduction of the vitamin content.

This invention is based on a new application of certain well known scientific facts, namely, that liquids expand on heating and contract on cooling; that by heating a liquid in a bottle or container which is filled with a predetermined quantity of the liquid, the said liquid may be expanded so as to reach the top level of the bottle or container at a predetermined temperature, and that if the heat expanded liquid is allowed to cool in the said container under air-tight conditions, the said liquid will contract to its original volume, leaving a natural vacuum inside the bottle or the container, which vacuum will preserve the liquid in the manner set forth above. Inasmuch as there is no air in a vacuum, the detrimental effect of oxidation of the liquid is avoided so long as the vacuum is maintained.

As used herein the expression "predetermined temperature" refers to the temperature at which the liquid concerned will become sterilised. This temperature varies for different liquids. In the case of milk it is 240° F., in the case of neera it is 190° F., and in the case of other liquids it can be determined empirically. These sterilizing temperatures may be varied to some extent in accordance with related variations in the rate and length of time of heat application.

As used herein the expression "predetermined volume" refers to that volume of any particular liquid concerned at normal temperature, which on thermal expansion on heating to the predetermined temperature as herein defined, would completely fill up the bottle or like container in which the liquid is to be preserved. The said predetermined volume will be different for different liquids depending upon various factors, such as the volume of the said bottle or container, the coefficient of expansion of the liquid and the predetermined temperature for the liquid concerned. The said predetermined volume can be determined empirically and will be substantially less than the inside volume of the bottle or like container.

Based on the above stated scientific facts, this invention, comprises, in its broadest aspects, a process for preserving milk, neera and like perishable liquids which consists in filling a bottle or like container with a predetermined quantity of the liquid as herein defined, heating it to a predetermined temperature as herein defined, closing or sealing it air-tight at the said predetermined temperature and allowing the said bottle or container with its liquid contents to cool to normal temperature under air-tight conditions, thereby creating a vacuum above the liquid due to contraction of said liquid.

In order to retain the original flavor and aroma of the liquid it is advisable to heat indirectly the vessel containing the liquid to be preserved; this may, for instance, be achieved by means of a double-walled water bath containing water in the main bath to serve as a bath for the vessels containing the liquids to be sterilized but also containing water in the annular space.

Where the liquid has to be heated to a temperature above 212° F., a pressure heating apparatus should be used.

The invention will now be described with reference to the accompanying drawing. Fig. 1 illustrates an apparatus for applying indirect heat to the bottle or container in which a liquid such as milk is to be preserved.

In the drawings, the apparatus comprises a double-walled tank 4 defined by an outer wall 5 and an inner wall 6 spaced therefrom. The inner wall 6 defines an inner chamber within which may be positioned bottles of liquid such as 1. This inner chamber is surrounded by an annular chamber positioned between the walls 5 and 6. Both chambers are closed by an air-tight lid 8 positioned over the tank thereby sealing the same. An aperture such as 9 may be provided in the lid 8, the purpose of which will become apparent as the description proceeds. The containers 1, 1, 1, . . . are filled with a predetermined volume of milk 2 as herein defined, leaving a space 3 above the top level of the milk. In a ten ounce bottle, the vacant space 3, may be about 1½ to 2 cubic inches.

The bottles 1, 1, 1, . . . are suitably supported inside the double walled tank 4 and water is poured around the bottles until they are immersed in the water bath except for about 2 inches.

The outer wall 5 and the inner wall 6 of the double walled tank 4 should be about 6" apart. The annular space between the two walls 5 and 6 respectively, is also filled with water, and heat is applied at the bottom of the tank 4.

As the temperature of the water in the annular bath rises, heat is transferred to the inner water bath containing the containers and is, in turn, transferred to the liquid within the containers themselves. Thus, by means of indirect heating, the temperature of the liquid to be sterilized is raised to that necessary to achieve sterilization.

The tank 4 is fitted with an air-tight lid 8 which completely covers both the inner water bath and the annular water bath surrounding it. This lid 8 is preferably provided with an aperture 9 which may be closed when the steam generated has displaced most of the air within the tank. This will save time and economize on the heat required to maintain the liquid at the required temperature and will help in the preservation of the flavor and aroma of the liquid. In fact the presence of the steam in the tanks and in actual contact with the milk in the unsealed containers is an important factor in helping to retain the original aroma and taste. It is also believed that the remarkable results achieved are in no small measure due to the displacement by steam of most of the air from the tank and of all of the air from containers for the liquid during the sterilizing and sealing steps of the process.

To insure displacement of the air by the steam the displaced air is first vented out of the apparatus during the heating phase, the steam within the tank is then built up to a pressure of at least ten (10) pounds and the liquid containers are sealed under said pressure.

It is also important to note that by sterilizing and sealing under a minimum pressure of ten (10) pounds the liquid in the containers is maintained in such a condition as to insure against deterioration of the properties of taste, color and aroma. It is further believed that this also may contribute to the remarkable results achieved.

As soon as the inside temperature reaches 240° F. the heating is stopped and the bottles or like containers are closed or sealed air-tight while still under pressure in any known manner. They are then removed from the tank and allowed to cool under air-tight conditions, so that a natural vacuum is formed in the space 3 as a result of the contraction in the volume of the heat expanded liquid.

The rate of heating and cooling should be adjusted so that the finished product is sterile but not otherwise materially affected. In the example described herein the heating phase takes about ¾ of an hour.

Of course, the temperature conditions vary for the different liquids but the general procedure for all liquids is substantially the same as that broadly described above.

It should also be understood that although filling the containers to the "predetermined volume" is preferable, substantially the same results may be achieved by a lesser volume in which event the unfilled space in the container would be filled with steam which upon condensation to water would mingle with the liquid leaving the space air-free. Conversely, filling with a greater volume would merely result in spillage of the excess volume.

In practicing the invention for the treatment of milk and like perishable foods it is essential to achieve complete elimination of all bacteria and micro-organisms, i. e. render the liquid completely sterile. In the case of milk I have found that sterile milk cannot be attained unless the sterilization temperature is at least 240° F. in the example of the process as herein described. Since any higher temperature is not only unnecessary but imparts undesirable changes in taste, color and aroma notwithstanding the use of the aforementioned double tank water-bath system and the presence of live steam, the importance of the aforementioned specific sterilization temperature to the process should be readily appreciated. However the adverse effects of the higher temperatures may be minimized if the heat application time is shortened in relation thereto.

The importance of the natural vacuum created in the top of the container should also be appreciated, especially its importance in helping to preserve the properties of the milk after it has been processed and bottled or canned. In this connection it is of course well known that the spoilage of milk is due to bacteria and micro-organisms contained in the milk itself. It is further believed that the physical properties may also be adversely affected by oxidation. Moreover, even sterile milk will spoil if it is brought in contact with non-sterile air which naturally contains bacteria and micro-organisms. Although sterile milk in contact with sterile air will remain unspoiled for a considerable period of time, nevertheless the contact of the two will eventually adversely affect the physical properties because of oxidation. However, my sterile milk alone without the presence of even sterile air, being in a vacuum, will remain fresh and unspoiled indefinitely.

From the foregoing description it should be apparent that I have provided a unique, practical, and inexpensive process and apparatus for rendering milk or similar foods sterile without adversely affecting the taste, color, aroma, vitamin content or general physical and chemical properties thereof. Of even greater importance is the packaging phase of the process whereby the milk or like perishable food is sealed in air-tight and air-free containers, thereby preserving the same in a fresh state for indefinite periods of time without refrigeration or other preservative conditions.

What I claim is:

1. A process for preserving perishable liquids in their substantially natural and fresh physical state, chemical composition and nutritive values including properties of flavor, color and aroma; which comprises the steps of filling a plurality of containers each with a predetermined quantity of said liquid, indirectly heating said filled containers in a sterilizing zone under pressure in the presence of steam at a rate and until the contents of said containers reach the sterilizing temperature whereby said liquid is sterilized, at least the latter part of said heating being conducted in the absence of most of the air from said sterilizing zone, said predetermined quantity being such that upon heating to said sterilizing temperature the liquid will expand to completely fill the containers, sealing the containers air-tight at the said sterilizing temperature, removing said sealed containers and cooling the same under air-tight conditions until the contents of the containers reach normal room temperatures, thereby creating above the liquid in each of the containers a natural vacuum formed by the contraction of the heat expanded liquid as a result of cooling under air-tight conditions.

2. A process for preserving milk so that it will substantially retain the chemical, physical and nutritive properties of fresh milk; which comprises the steps of filling a plurality of containers each with a predetermined quantity of milk, indirectly heating said filled containers in a sterilizing zone under pressure in the presence of steam at a rate and until the contents of said containers reach the sterilizing temperature whereby said milk is sterilized, at least the latter part of said heating being conducted in the absence of most of the air from said sterilizing zone, said predetermined quantity being such that upon heating to said sterilizing temperature the milk will expand to completely fill the containers, sealing the containers air-tight at the said sterilizing temperature, removing said sealed containers and cooling the same under air-tight conditions until the contents of the containers reach normal room temperatures, thereby creating above the milk in each of the containers a natural vacuum formed by the contraction of the heat expanded milk as a result of cooling under air-tight conditions.

3. A process for indefinitely preserving perishable liquids without adversely affecting their physical properties including flavor, color and aroma; which comprises the steps of indirectly heating said liquid to the sterilizing temperature thereof in a sterilizing zone under pressure in the presence of steam and in the absence of most of the air from said sterilizing zone, sealing said liquid in air-tight containers while the same are in said sterilizing zone and the liquid is still under pressure and at substantially the sterilizing temperature, and cooling said containers with their liquid contents, thereby creating above the liquid in each container a natural vacuum formed by the contraction of the heat-expanded liquid.

4. The process of claim 1 in which said pressure is sufficient to maintain said liquid in a condition which will insure against appreciable deterioration of said properties of flavor, color and aroma.

5. A process for preserving milk in substantially its natural fresh physical state and chemical composition including natural fresh flavor, color and aroma; which comprises the steps of filling at least one container with a predetermined quantity of milk, heating said container indirectly in a tank containing water whereby sufficient steam is generated to displace most of the air in said tank and container, venting said displaced air out of said tank and container, continuing said heating to generate a steam pressure of at least ten (10) pounds per square inch and until said milk has reached a sterilizing temperature of substantially 240° F., sealing said container air-tight, and cooling the same, whereby said milk is sealed in said container in substantially complete absence of air.

6. The process of claim 5 characterized by the sealing of said container while the same is still under pressure and the liquid is at substantially the sterilizing temperature.

7. A process for preserving perishable liquids in their natural and fresh state which comprises the steps of: partially filling a container with said liquid, indirectly and uniformly heating said container in a sterilizing zone in the presence of steam to substantially the sterilizing temperature of said liquid, at least the latter part of said heating being conducted in the absence of most of the air from said sterilizing zone, said steam being in actual contact with the liquid in the unsealed containers during said heating, permitting the liquid in the containers to expand, sealing the container air-tight at the said sterilizing temperature and cooling the said container with its liquid contents to normal temperature under air-tight conditions, thereby creating above the liquid a natural vacuum formed by the contraction of the heat expanded liquid and the condensation of any steam entrapped in said container as a result of said cooling under air-tight conditions.

8. A process for preserving perishable liquids which consists in filling a container with at least a predetermined quantity of the liquid, heating said filled container to a predetermined sterilizing temperature in a sterilizing zone, at least the latter part of said heating being conducted in the absence of most of the air from said sterilizing zone, said predetermined quantity being such that upon heating to said sterilizing temperature the liquid will expand to at least completely fill the container, sealing the container air-tight at the said predetermined temperature and cooling the said container with its liquid contents to normal temperature under air-tight conditions, thereby creating above the liquid a natural vacuum formed by the contraction of the heat expanded liquid as a result of cooling under air-tight conditions.

9. A process for preserving perishable liquids without adversely affecting their physical properties which comprises; heating at least one container of said liquid indirectly in a sterilizing zone and under pressure to the sterilizing temperature thereof so that the heat transfer from the heating source to liquid is retarded, at least the latter part of said heating being conducted in the absence of most of the air from said sterilizing zone, sealing said container at the sterilizing temperature and cooling the same whereby a natural vacuum is formed in the top of said container.

10. A process for preserving perishable liquids which consists in filling a container with a predetermined quantity of the liquid, heating said filled container to a predetermined sterilizing temperature in a sterilizing zone, at least the latter part of said heating being conducted in the absence of most of the air from said sterilizing zone, said predetermined quantity being such that upon heating to said sterilizing temperature the liquid will expand to completely fill the container, sealing the container air-tight at the said predetermined temperature and cooling the said container with its liquid contents to normal temperature under air-tight conditions, thereby creating above the liquid a natural vacuum formed by the contraction of the heat expanded liquid as a result of cooling under air-tight conditions.

11. A process according to claim 10, in which the heat is indirectly and uniformly applied to the container.

12. A process for indefinitely preserving perishable liquids in their natural and fresh state which comprises the steps of: filling a container with a predetermined quantity of the liquid, indirectly and uniformly heating said filled container in a sterilizing zone to substantially the sterilizing temperature of said liquid, at least the latter part of said heating being conducted in the absence of most of the air from said sterilizing zone, said predetermined quantity being such that upon heating to said sterilizing temperature the liquid will expand to completely fill the container, sealing the container air-tight at the said sterilizing temperature and cooling the said container with its liquid contents to normal temperature under air-tight conditions, thereby creating above the liquid a natural vacuum formed by the contraction of the heat-expanded liquid as a result of cooling under air-tight conditions, said heating being accelerated by the presence of steam under pressure, said steam being in actual contact with the liquid in the unsealed containers during the sterilizing step.

References Cited in the file of this patent

UNITED STATES PATENTS

| | | |
|---|---|---|
| 524,649 | Popp et al. | Aug. 14, 1894 |
| 638,283 | Russell | Dec. 5, 1899 |
| 1,241,163 | Stevens et al. | Sept. 25, 1917 |
| 2,493,663 | Fowler | Jan. 3, 1950 |